Patented May 9, 1939

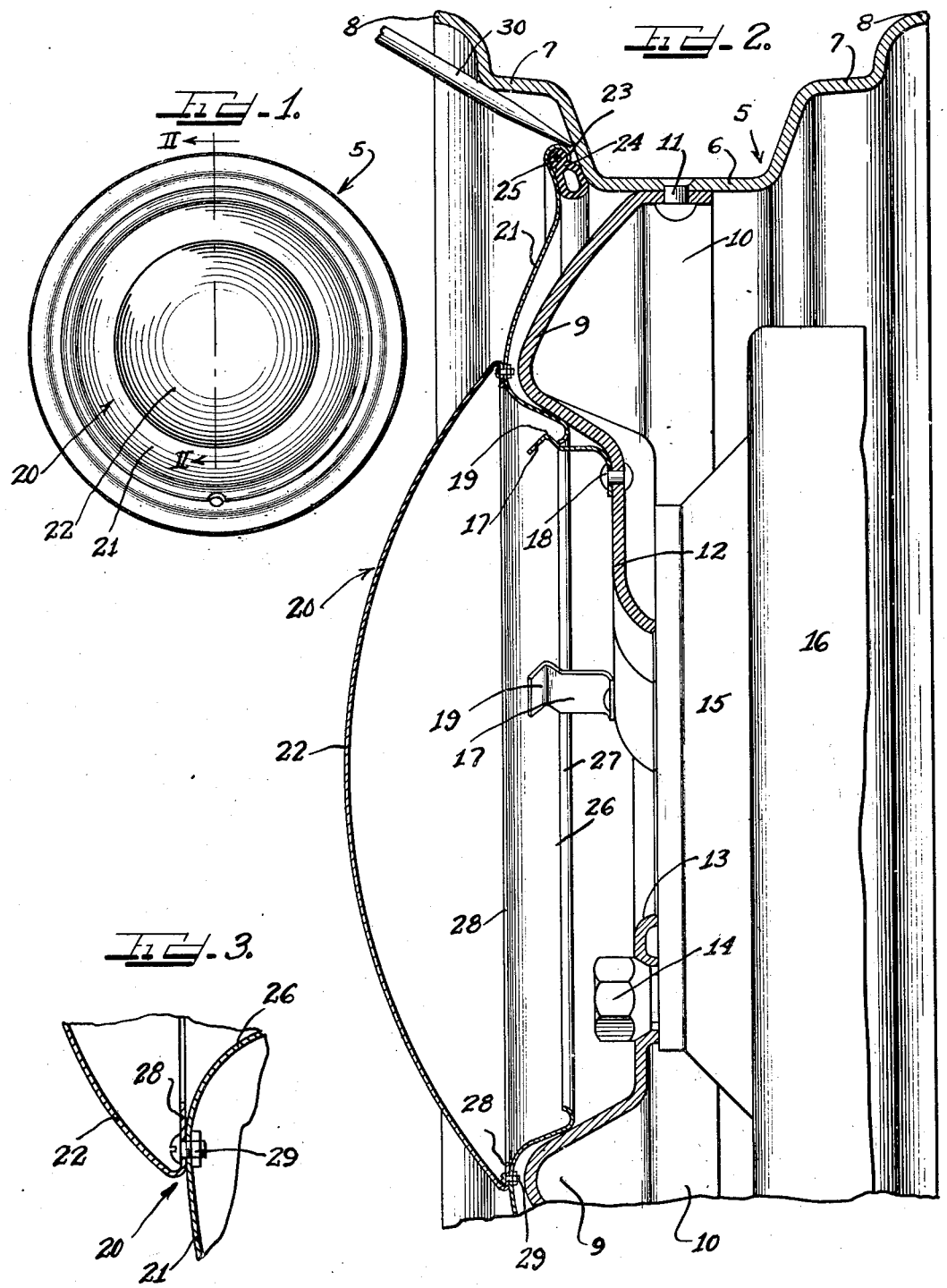

2,157,908

UNITED STATES PATENT OFFICE 2,157,908

ORNAMENTAL WHEEL DISK STRUCTURE

George Albert Lyon, Allenhurst, N. J.

Application July 29, 1935, Serial No. 33,689

5 Claims. (Cl. 301—37)

This invention relates to ornamental disks, and more particularly to an ornamental disk structure for disposition over the side surface of a vehicle wheel, both by itself and in combination with a wheel structure.

More specifically, the invention relates to a novel ornamental wheel disk structure which may be readily attached to or pried off a wheel as a one-piece unit, although the wheel disk structure embodies a plurality of parts joined together.

With the advent of streamlined automotive vehicles, it has become desirable to dress up the wheels of the vehicle to conform to the exterior streamlined appointments of the other parts of the vehicle. Ornamental wheel disks for overlying the side surfaces of the vehicle wheels are desirable for this purpose. In so treating the wheels, it is also desirable to have the ornamental disks two-toned or embodying different colors in the same disk. However, this treatment of the wheels must be accomplished with a minimum of expense so as not to add materially to the cost of the vehicle as a whole.

I therefore propose to provide a wheel disk structure made up of a plurality of separate, relatively standard parts which may have any desirable external finish or color scheme, and which are so joined together as to provide a relatively integral disk structure which may be handled as though it were a one-piece unit.

Another object of the invention is to provide an ornamental disc structure including a plurality of initially separate parts each designed to cover a different portion of the side surface of a wheel, and which parts may be readily joined together in such a manner as to form a unitary structure which may be handled as one piece.

A further object of the invention is the provision of an ornamental disk structure made up of a plurality of initially separate parts joined together so that the entire structure may be snapped on or pried off a vehicle wheel as a one-piece unit.

Also an object of this invention is the provision of an ornamental disk structure made up of a plurality of initially separate parts each designed to cover a different portion of the side surface of a wheel, one of said parts having an underturned flange in engagement with the other part, and securing means joining the parts by engagement with said flange so that the securing means are concealed in the finished structure.

In accordance with the general features of this invention, there is provided an ornamental disk structure for use with a wheel of the type embodying integral rim and hub parts, the hub part of which has centrally disposed spring elements for retaining cooperation with a hub cap or the like, the entire wheel disk structure being so arranged as to be held upon the wheel, preferably only by the said spring elements. The wheel disk is made up of a plurality of separate parts, each of which may have a color or external finish as desired, and each of which is designed to overlie a different portion of the side surface of the wheel. One of these parts is provided with an inwardly disposed margin bent for engagement with the aforesaid spring elements on the hub part of the wheel to hold the entire disk structure in place on the wheel. The two parts of the disk structure are joined together, preferably by concealed securing means, in an easy and ready manner so that the composite disk structure may be snapped on and pried off the wheel as a one-piece unit. The disk structure may also embody a cushioning element for contact with the wheel rim, if so desired.

Other objects and features of this invention will more fully appear from the following detailed description, taken in connection with the accompanying drawing, which illustrates a single embodiment thereof, and in which:

Figure 1 is a side elevation of a combined wheel and ornamental disk structure embodying features of the present invention;

Figure 2 is an enlarged fragmentary sectional view of the structure shown in Figure 1, taken substantially as indicated by the line II—II of Figure 1, looking in the direction of the arrows; and Figure 3 is an enlarged fragmentary portion of the ornamental disk structure as seen in the lower part of Figure 2.

The reference character 5 designates generally a drop center tire rim of a vehicle wheel. This rim includes a base flange 6 disposed between opposite intermediate flanges 7—7 which terminate integrally in opposite edges 8—8. This rim is secured to the hub or central part 9 of the wheel, which part has at its outer periphery a laterally extending flange 10 secured to the base flange 6 of the rim by means of rivets 11 or in any other suitable manner.

The hub part 9 of the wheel is provided with a central fastening flange 12 provided with a centrally disposed hub opening 13. Suitable attachment means such as the cap screws 14 extend through the flange 12, and by such means the vehicle wheel may be attached to a vehicle axle part 15 associated with the usual brake drum 16 in a known manner, or the wheel may be mounted in like manner upon a spare wheel bracket.

The wheel is provided with a plurality of spaced hub cap retaining spring elements 17 secured to the fastening flange 12 by means of rivets 18 or in any other suitable manner. Each of the retaining springs 17 is shaped to provide a radially outwardly projecting portion 19 behind which an inwardly sloping engaging surface retains the hub cap or the like upon the wheel.

An ornamental disk, generally indicated by reference numeral 20, is shown disposed in operative position over the side surface of the vehicle wheel. This disk structure, while it may be handled as though it were a one-piece unit, is made up in this instance of a pair of initially separate members designated generally by reference numerals 21 and 22. Each of these members, as is seen in the drawing, is designed to cover a different portion of the side surface of the vehicle wheel.

The outer member 21 is annular in character and is designed to cover that portion of the side surface of the wheel between the fastening flange 12 and the rim. This member has an inwardly rolled outer margin 23 to provide a socket for the reception of a cushioning element 24 which in this instance is an annularly extending double tubular member, of the general shape of a figure 8 with one loop larger than the other, and made of rubber or some other suitable cushioning material. The smaller loop of the cushioning member is disposed in the groove formed by the margin 23 and is preferably provided with a spring wire 25 which holds the cushioning element in position. The other or larger loop of the element is preferably hollow and abuts the rim 5 when the disk structure is in position on the wheel to eliminate rattling and similar noises. The body portion of the member 21 somewhat generally follows the contour of the hub part 9 of the wheel and terminates in an inwardly disposed flange 26 having an outwardly bent edge 27 for engagement with the spring retaining elements 17. Such engagement is all that is necessary to hold the entire disc structure, including both parts 21 and 22, in position upon the wheel.

The other part 22 of the disc structure is shaped generally in simulation of a hub cap and is preferably of such a size as to not only cover the central opening through the part 21, but also to overlie and completely conceal the spring retaining elements 17. This member 22 is also provide with an annular underturned margin 28 spaced from the body of the member. The margin 28 lies against the member 21 and suitable securing means extend through the margin in engagement with the member 21 to unite the two parts 21 and 22 into a relatively integral structure which may be handled as though it were one piece.

In this instance, I have shown very economical and easily handled securing means in the form of bolt and nut connections 29 for uniting the two parts 21 and 22 of the disk structure. It will be seen that these joining means 29 are totally concealed by the body of the part 22 which, taken in conjunction with the concealment of the spring retaining elements 17, gives an external appearance of a solid disc wheel when the disk structure is in position upon the vehicle wheel.

It is now apparent that each of the parts of the disk structure may be relatively standard parts, manufactured separately and provided with any desirable external finish or color. It is a simple expedient by means of the fastening elements 29 to unite these parts into a disk structure having substantially any desirable two-tone color combination in keeping with the other external colors of the vehicle. Of course, either one of the parts 21 or 22 may be provided with several colors, if so desired. A pleasing color scheme for the disk structure is a chrome-finish for the outer part 21, and a color finish for the part 22 in keeping with the color of the vehicle body.

When the two parts 21 and 22 have been joined as above explained, it is a simple expedient to take the entire disk structure and snap it in position upon the wheel by pushing it radially towards the wheel. It is equally as simple an expedient to remove the entire disk structure as a one-piece unit from the wheel by inserting a suitable prying tool, generally indicated at 30, between the outer edge of the part 21 and the rim 5, utilizing the radially outward portion of an intermediate flange 7 as a fulcrum to pry against.

From the foregoing, it is apparent that I have provided an ornamental wheel disk structure which is extremely economical to manufacture and which may be very easily snapped on or pried off a vehicle wheel. The disk structure may be handled as a one-piece unit, and yet any desirable variable color combination may be provided on the structure because it includes a plurality of initially separate but readily unitable parts, it being much more economical to manufacture and finish the parts separately than to make a one-piece disk structure and endeavor to apply different colors or external finishes thereto.

It is, of course, to be understood that while I have illustrated and described in detail a preferred form of this invention, the invention is not to be thus limited, but only insofar as defined by the scope of the appended claims.

I claim as my invention:

1. An ornamental wheel disk structure for disposition over the side surface of a vehicle wheel, including a pair of separate members one of which is designed to cover the central portion of the wheel and which is provided with an underturned margin, and the other of which is designed to cover an outer portion of the wheel, and securing means joining said underturned margin of said central member to an intermediate portion of said outer member so as to be concealed by the respective member, the inner marginal portion of said outer member being bent axially inwardly to form a wheel engaging fastening flange for said members.

2. As an article of manufacture, an ornamental wheel accessory comprising an annulus of sheet material for disposition over the side of a wheel, said annulus having an axially and radially inwardly extending inner marginal portion adapted to engage a plurality of fastening fingers on the wheel, and a central dome-shaped member adapted to cover the central opening of said annulus, said member being substantially permanently secured to said annulus, whereby said member and said annulus may be pried off the wheel as a one piece unit.

3. With a wheel having a body part the central portion of which is recessed and an annular series of ornamental member retaining fingers secured in said recess and extending axially outwardly therefrom, the combination with said wheel of an ornamental ring cover member for disposition over the outer side of said wheel, said member having its inner marginal portion shaped to extend into said recessed central portion, the edge of said marginal portion being adapted to make a detachable engagement with said fingers, and a central dome-shaped member simulating a hub cap substantially permanently secured to said ring member, whereby said members may be assembled on and disassembled from said wheel as a single unit.

4. As an article of manufacture, an annular ornamental member for disposition over the side of a wheel and a central member substantially permanently secured to said annular member and shaped to cover the central opening thereof, one of said members having an axially inwardly extending skirt to form a circular holding flange adapted to detachably engage cooperating securing means on the wheel.

5. As an article of manufacture, an ornamental wheel accessory comprising an annulus of sheet material for disposition over the side of the wheel, said annulus having an axially and radially inwardly extending inner marginal portion adapted to engage a plurality of fastening fingers on the wheel, and a central dome-shaped member adapted to cover the opening in said annulus, said member being substantially permanently secured to said annulus radially outwardly of said inner marginal portion of said annulus, the radial inner edge portion of said inner marginal portion having a reverse curve which provides an axially outwardly extending edge for engagement with said fastening fingers.

GEORGE ALBERT LYON.